United States Patent
Lee et al.

(10) Patent No.: US 9,697,220 B2
(45) Date of Patent: Jul. 4, 2017

(54) SYSTEM AND METHOD FOR SUPPORTING ELASTIC DATA METADATA COMPRESSION IN A DISTRIBUTED DATA GRID

(71) Applicant: Oracle International Corporation, Redwood Shores, CA (US)

(72) Inventors: Robert H. Lee, San Carlos, CA (US); Harold Cameron Purdy, Lexington, MA (US); Gene Gleyzer, Lexington, MA (US); Harvey Raja, Manchester (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 378 days.

(21) Appl. No.: 14/322,576

(22) Filed: Jul. 2, 2014

(65) Prior Publication Data

US 2015/0169610 A1    Jun. 18, 2015

Related U.S. Application Data

(60) Provisional application No. 61/915,900, filed on Dec. 13, 2013.

(51) Int. Cl.
| | | |
|---|---|---|
| G06F 17/30 | (2006.01) | |
| H04L 29/08 | (2006.01) | |
| H04L 29/14 | (2006.01) | |

(52) U.S. Cl.
CPC .. *G06F 17/30153* (2013.01); *G06F 17/30327* (2013.01); *G06F 17/30371* (2013.01); *H04L 67/1095* (2013.01); *H04L 67/1097* (2013.01); *H04L 69/40* (2013.01)

(58) Field of Classification Search
USPC .......................................................... 707/693
See application file for complete search history.

(56) References Cited

U.S. PATENT DOCUMENTS

| | | | | |
|---|---|---|---|---|
| 5,857,196 A | * | 1/1999 | Angle | G06F 17/30625 |
| 6,694,323 B2 | * | 2/2004 | Bumbulis | G06F 17/30327 |
| 7,706,386 B2 | * | 4/2010 | Ma | H04L 12/5693 370/392 |
| 8,074,035 B1 | * | 12/2011 | Per | G06F 11/1451 707/610 |

(Continued)

OTHER PUBLICATIONS

European Patent Office, International Searching Authority, International Search Report and Written Opinion dated Dec. 22, 2015 for International Application No. PCT/US2015/052458, 17 pages.

(Continued)

*Primary Examiner* — Debbie Le
(74) *Attorney, Agent, or Firm* — Tucker Ellis LLP (57) ABSTRACT

A system and method can support metadata compression in a distributed data grid. The system can store a plurality of keys in compact data structure (such as a radix tree) in a heap, wherein each said key is associated with an entry in a journal off-heap. Furthermore, the system can look up the tree for a key, wherein the key is associated with a journal ticket that represents a virtual address of an entry in the journal. Then, the system can use the journal ticket to manage the entry in the journal that is associated with said key.

20 Claims, 7 Drawing Sheets

(56) References Cited

U.S. PATENT DOCUMENTS

| | | | |
|---|---|---|---|
| 8,977,600 B2* | 3/2015 | Crupi | 707/600 |
| 9,021,050 B2* | 4/2015 | Shaver | G06F 12/00 |
| | | | 707/741 |
| 9,242,147 B2* | 1/2016 | Onuki | A63B 37/0074 |
| 2005/0278496 A1 | 12/2005 | Redestig | |
| 2006/0036426 A1 | 2/2006 | Barr et al. | |
| 2009/0099342 A1* | 4/2009 | Braconnot | C08F 2/24 |
| | | | 530/391.1 |
| 2010/0011283 A1 | 1/2010 | Wray | |
| 2012/0222005 A1* | 8/2012 | Harris | G06F 9/45504 |
| | | | 717/120 |
| 2013/0067190 A1 | 3/2013 | Gissel et al. | |
| 2014/0067986 A1* | 3/2014 | Shaver | G06F 12/00 |
| | | | 709/213 |

OTHER PUBLICATIONS

Satish Palaniappan, "Efficient data transfer through zero copy Zero copy, zero overhead", © Copyright IBM Corporation 2008, Sep. 2, 2008, 10 pages.

Hrishikesh Amur et al., "Memory-Efficient GroupBy-Aggregate using Compressed Buffer Trees", Proceedings of the $4^{th}$ Annual Symposium on Cloud Computing, SoCC '13, Jan. 1, 2013, 16 pages.

Harvey Raja, "Elastic Data", Mar. 21, 2013, retrieved from: <https://coherence.java.net/as sets/pdf/2013-03-21-Harvey-Raja-Elastic-Data-Overview.pdf> retrieved on Mar. 23, 2015, 26 pages.

European Patent Office, International Searching Authority, International Search Report and Written Opinion dated Feb. 25, 2015 for International Application No. PCT/US2014/067960, 11 pages.

* cited by examiner

SYSTEM AND METHOD FOR SUPPORTING ELASTIC DATA METADATA COMPRESSION IN A DISTRIBUTED DATA GRID

CLAIM OF PRIORITY

This application claims priority on U.S. Provisional Patent Application No. 61/915,900, entitled "SYSTEM AND METHOD FOR SUPPORTING ELASTIC DATA METADATA COMPRESSION IN A DISTRIBUTED DATA GRID" filed Dec. 13, 2013, which application is herein incorporated by reference.

CROSS REFERENCE TO RELATED APPLICATIONS

This application is related to the following patent application, which is hereby incorporated by reference in its entirety:

U.S. patent application titled "SYSTEM AND METHOD FOR SUPPORTING MEMORY ALLOCATION CONTROL WITH PUSH-BACK IN A DISTRIBUTED DATA GRID", U.S. patent application Ser. No. 14/298,458, filed Jun. 6, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support metadata compression in a distributed data grid. The system can store a plurality of keys in compact data structure (such as a radix tree) in a heap, wherein each said key is associated with entry in an off-heap journal. Furthermore, the system can look up the tree for a key, wherein the key is associated with a journal ticket that represents a virtual address of an entry in the journal. Then, the system can use the journal ticket to manage the entry in the journal that is associated with said key.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Oracle Coherence data grid as an example for a distributed data grid. It will be apparent to those skilled in the art that other types of distributed data grids can be used without limitation.

Described herein are systems and methods that can support elastic data metadata compression in a distributed grid.

Distributed Data Grid

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
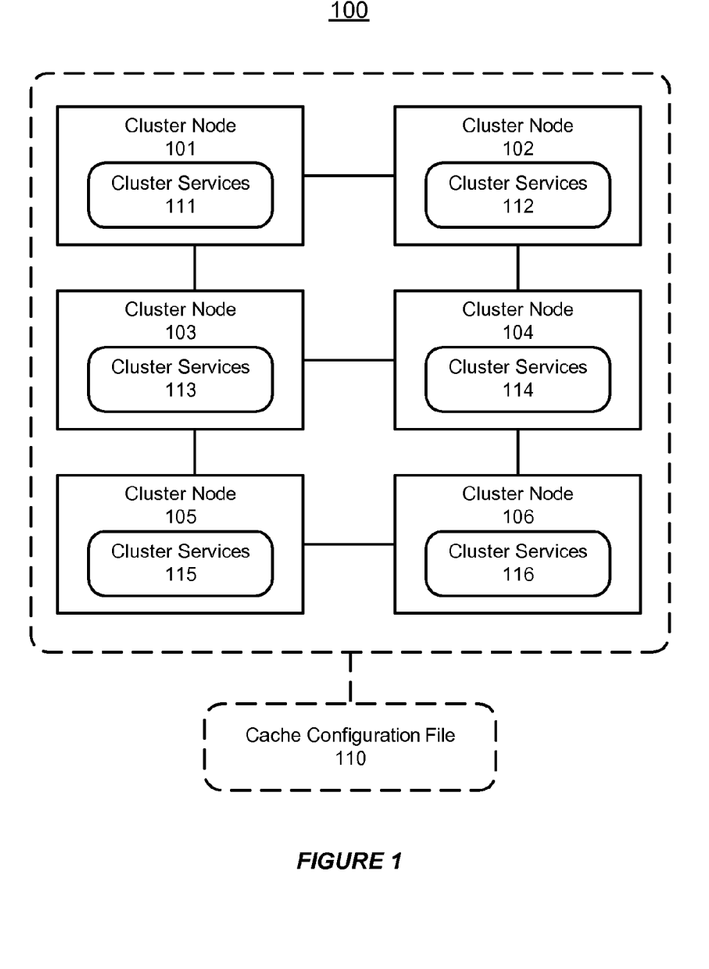
FIG. 1 is an illustration of a data grid cluster in accordance with various embodiments of the invention.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Elastic Data Structure

In accordance with an embodiment of the invention, a data grid cluster can use an elastic data structure to seamlessly store data across memory and disk-based devices. Furthermore, the elastic data structure can use a journaling technique to optimize the data storage across memory and disk.

Figure 2:
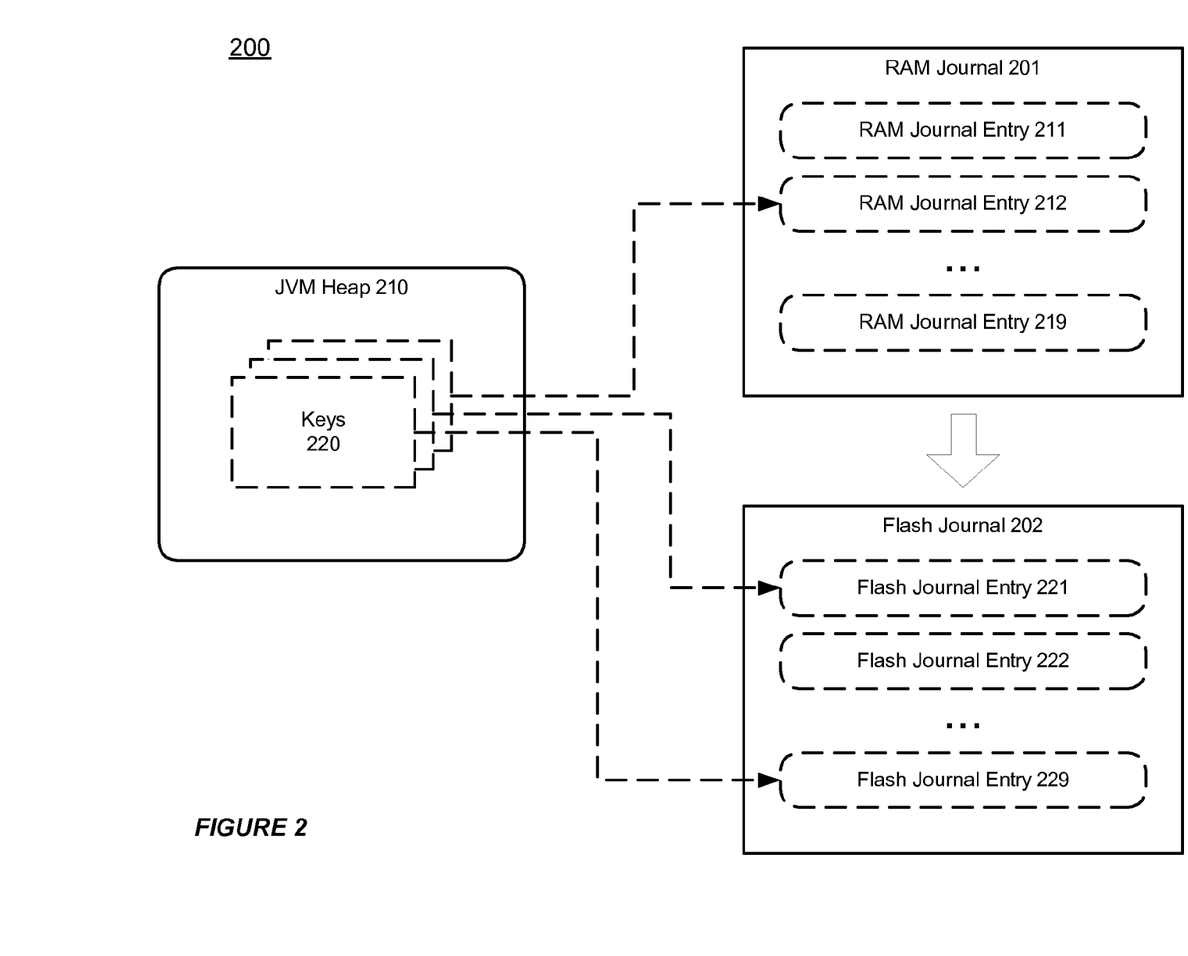
FIG. 2 shows an illustration of supporting an elastic data structure in a distributed data grid, in accordance with an embodiment of the invention.

FIG. 2 shows an illustration of supporting an elastic data structure in a distributed data grid, in accordance with an embodiment of the invention. As shown in FIG. 2, a data grid cluster 200 can use different types of journals 201-202 for recording state changes associated with a sequence of modifications on data storage. For example, the data storage can include both a random access memory (RAM) and various disk-based devices such as solid state disks (SSDs).

In accordance with an embodiment of the invention, the data grid cluster 200 can take advantage of an elastic data structure, which enables the data grid cluster 200 to store data in the SSDs and/or read data from the SSDs at a near memory speed.

As shown in FIG. 2, the data grid cluster 200 can use a RAM journal 201 for storing data in-memory and can use a flash journal 202 for storing data to the flash-based devices. Additionally, the RAM journal 201 can work with the flash journal 202 to enable seamless data overflow from the RAM storage to the flash disk storage.

Furthermore, each of the journals 201-202 used by the data grid cluster 200 can contain multiple entries. For example, the RAM journal 201 can include RAM journal entries 211-219, while the flash journal 202 can include flash journal entries 221-229.

In accordance with an embodiment of the invention, the system can associate the value stored in each different journal entries 211-219 and 221-229 with a different key 220. As the changes are applied to the elastic data storage, each specific key 220 can remain associated with a journal entry 211-219 or 221-229 that contains the latest value.

Also, stale values may accumulate in the RAM journal 201 and the flash journal 202, since new values may be written for different keys 220 and previous changes in the elastic data structure 200 may become obsolete. The system can evacuate these stale values, e.g. at regular intervals, in order to make room for new values to be written in the journals 201-202.

In accordance with an embodiment of the invention, the system can maintain a compact data structure in memory (e.g. using a tree structure on a JVM heap 210), for keeping track of which journal entry contains the current value for a particular key. Thus, a user can find a value stored in a journal entry in the elastic data structure 200, by first looking up for a key 220 stored on the JVM heap 210.

In accordance with an embodiment of the invention, caches that use the RAM journal 201 and the flash journal 202 can be configured as part of a cache scheme definition within a cache configuration file. Additionally, the system allows a user to configure the journaling behavior by overriding the out-of-box configuration.

Also, the RAM journal 201 and the flash journal 202 can be used in different manners. For example, the RAM journal 201 and the flash journal 202 can be used for supporting backing maps and backup storage in the data grid cluster 200. Furthermore, the RAM journal 201 and the flash journal 202 can be used for supporting composite caches (e.g. a near cache).

Metadata Compression

In accordance with an embodiment of the invention, the system can use a compact attribute storage for supporting various high-level caching features.

Figure 3:
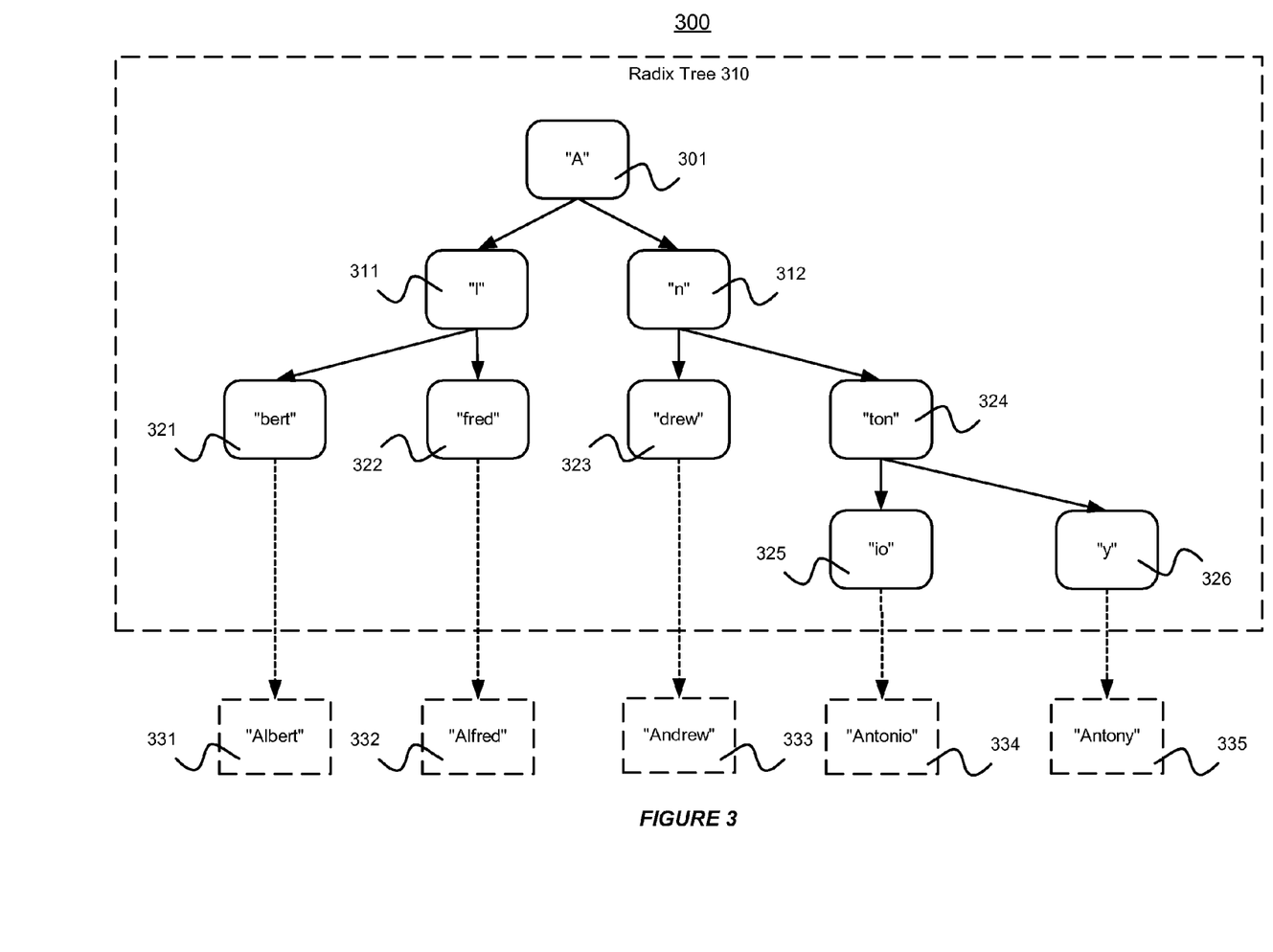
FIG. 3 shows an illustration of storing compressed keys on-heap in a distributed data grid, in accordance with an embodiment of the invention.

FIG. 3 shows an illustration of storing compressed keys on-heap in a distributed data grid, in accordance with an embodiment of the invention. As shown in FIG. 3, the distributed data grid 300 can use a radix-tree 310 for storing different keys 331-335 on-heap, e.g. on a Java virtual machine (JVM) heap.

For example, the keys 331-335 stored in the radix-tree 310 can include "Albert" 331, "Alfred" 332, "Andrew" 333, "Antonio" 334 and "Antony" 335. As shown in FIG. 3, the root node 301 for the radix-tree 310 stores a character "A", since all keys 331-335 stored in the radix-tree 310 start with a character "A."

Furthermore, both the two keys, "Albert" 331 and "Alfred" 332, which contain a character "I," can share the same node 311. Additionally, the key "Albert" 331 uses the node 321, which contains the characters "bert" and the key "Alfred" 332 uses the node 322, which contains the characters "fred." Thus, the radix-tree 310, which is a trie data structure, can be optimized in saving memory space on-heap, since any node in the radix-tree 300 with only one child can be merged with its child.

Similarly, the key "Andrew" 333 uses the nodes 301, 312, and 323, while the key "Antonio" 334 uses the nodes 301, 312, 324 and 325, and the key "Antony" 335 uses the nodes 301, 312, 324 and 326.

In accordance with an embodiment of the invention, each compressed key 331-335 stored in the radix-tree 310 can correspond to a value stored in a journal entry off-heap. Additionally, in order to improve efficiency, tiny values (e.g. values with a size up to seven bytes) can be stored directly in the radix-tree 310, instead being stored off-heap.

Also, the compressed keys 331-335 stored in the radix-tree 310 can support the transparent overflow from a RAM journal to a flash journal when the RAM journal is full.

Figure 4:
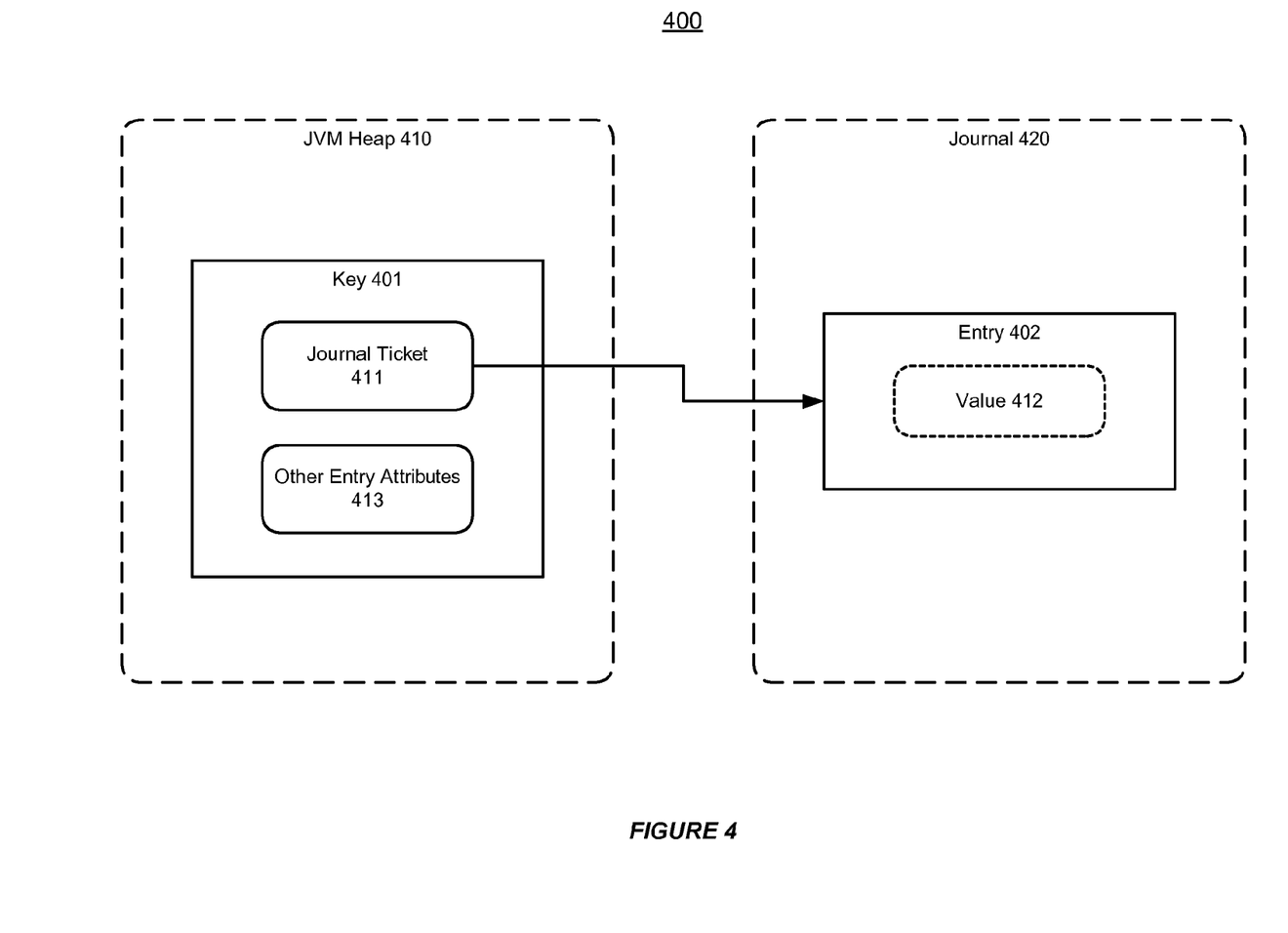
FIG. 4 shows an illustration of supporting a journal ticket in a distributed data grid, in accordance with an embodiment of the invention.

FIG. 4 shows an illustration of supporting a journal ticket in a distributed data grid 400, in accordance with an embodiment of the invention. As shown in FIG. 4, a compressed key 401, which is stored on-heap (e.g. on a JVM heap 410) can be associated with a journal ticket 411. The journal ticket 411 can represent a virtual address for a value 412 that is stored off-heap, such as in an entry 402 of a journal 420 that corresponds to the key 401. Additionally, the key 401 can represent additional attributes 413 that are associated with the value 412 stored off-heap (such as an eviction attribute and an expiry attribute).

Figure 5:
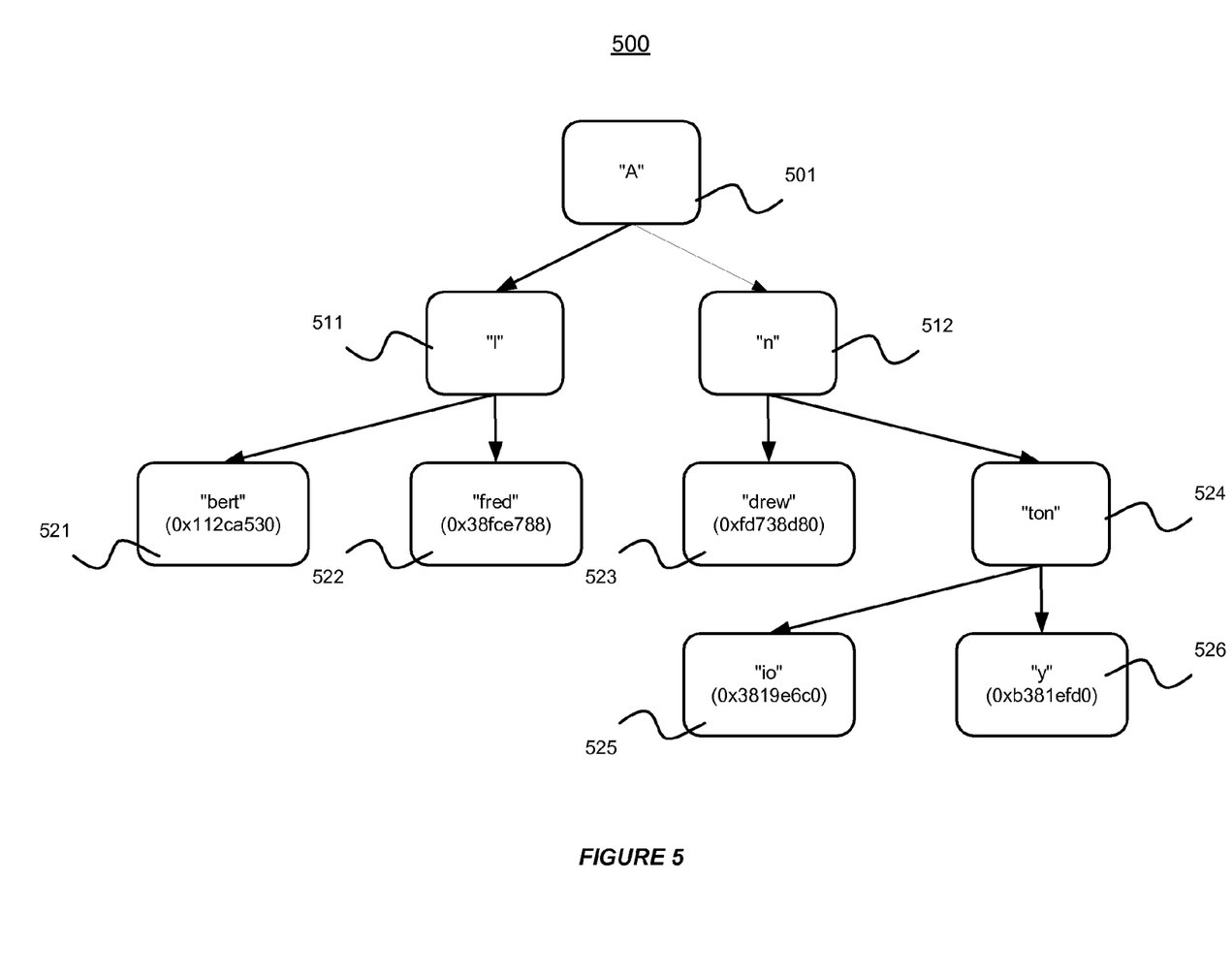
FIG. 5 shows an illustration of supporting an elastic data ticket tree in a distributed data grid, in accordance with an embodiment of the invention.

FIG. 5 shows an illustration of supporting an elastic data ticket tree in a distributed data grid, in accordance with an embodiment of the invention. As shown in FIG. 5, a radix-tree 500 can be used to store compressed keys on-heap. Furthermore, each compressed key stored in the radix-tree 500 can be associated with a journal ticket, or a virtual address for a value in a journal that corresponds to the key.

For example, the key, "Albert," which involves the nodes 501, 511, and 521, can be associated with a journal ticket, "0x112ca530". The key, "Alfred," which involves the nodes 501, 511, and 522, can be associated with a journal ticket, "0x38fce788". The key, "Andrew," which involves the nodes 501, 512, and 523, can be associated with a journal ticket, "0xfd738d80". The key, "Antonio," which involves the nodes 501, 512, 524 and 525, can be associated with a journal ticket, "0x3819e6c0". Also, the key, "Antony," which involves the nodes 501, 512, 524 and 526, can be associated with a journal ticket, "0xb381efd0".

Figure 6:
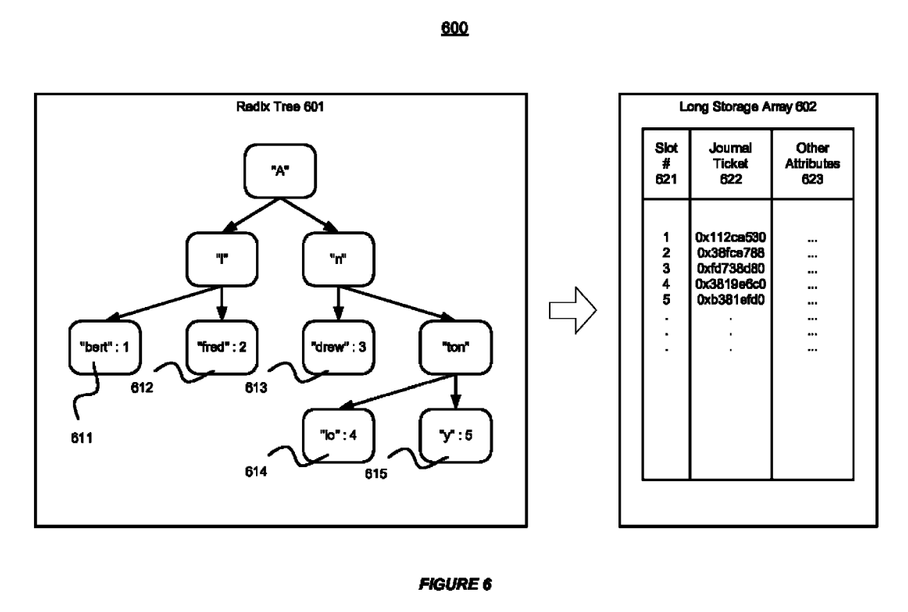
FIG. 6 shows an illustration of supporting elastic data metadata compression in a distributed data grid, in accordance with an embodiment of the invention.

FIG. 6 shows an illustration of supporting metadata compression in a distributed data grid, in accordance with an embodiment of the invention. As shown in FIG. 6, a distributed data grid 600 can use a radix-tree 601 to store different compressed keys on-heap (e.g. a JVM heap). These compressed keys (i.e. a key-set) can include "Albert", "Alfred", "Andrew", "Antony" and "Antonio".

Furthermore, each compressed key stored in the radix-tree 601 can be associated with a journal ticket 622, which is stored separately on-heap (such as in a long storage array 602). Additionally, each journal ticket 622 stored in the long storage array 602 can be associated with a slot number 621 (or a row number).

As shown in FIG. 6, the node 611, which is used to store the key "Albert," includes a journal ticket, "0x112ca530," stored at the slot 1 in the long storage array 602. The node 612, which is used to store the key "Alfred," includes a journal ticket, "0x38fce788," stored at the slot 2 in the long storage array 602. The node 613, which is used to store the key "Andrew," includes a journal ticket, "0xfd738d80," stored at the slot 3 in the long storage array 602. The node 614, which is used to store the key "Antonio," includes a journal ticket, "0x3819e6c0," stored at the slot 4 in the long storage array 602. Finally, the node 615, which is used to store the key "Antony," includes a journal ticket, "0xb381efd0," stored at the slot 5 in the long storage array 602.

Also as shown in FIG. 6, the long storage array 602 can include additional columns 623 that encode other attributes, such as expiry, touch-time, units, index values, etc. The storage format for the long storage array 602 allows for an arbitrary number of additional columns 623.

Furthermore, these additional columns 623 can be dynamically added into long storage array 602, and the corresponding attributes can be dynamically associated with the key-set in the radix-tree 601 with near-zero fixed space overhead beyond the attribute encoding size. This can be beneficial, e.g. for large data sets, since the system, which can be implemented on the Java VM runtime, would require considerably more space overhead if other representations are used.

Additionally, the system can further compact multiple small attributes together into a single attribute 623, in order to further reduce the space overhead for the metadata. For example, the journal ticket 622 and each of the other attributes 623 can be a Java "long" values, which takes eight (8) bytes of space. The system can split a single eight-byte attribute into multiple smaller virtual attributes for storing more information.

Thus, by utilizing such a compact data structure, the system can store metadata information for very large datasets.

Figure 7:
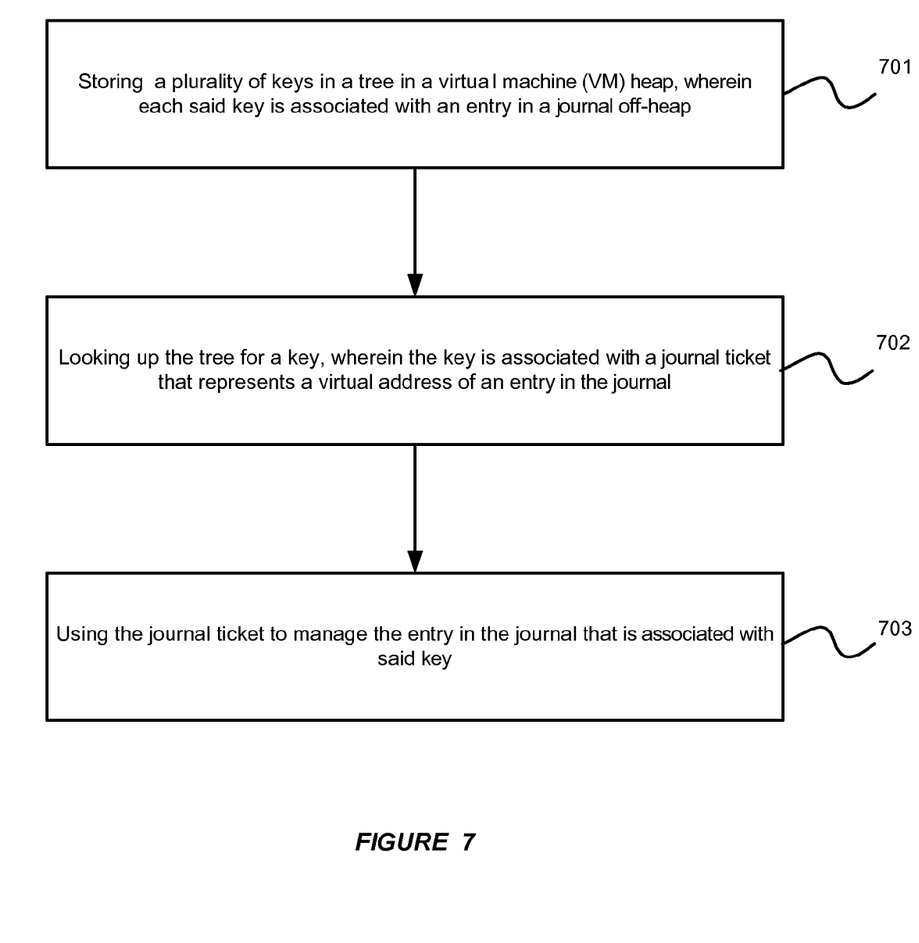
FIG. 7 illustrates an exemplary flow chart for supporting elastic data metadata compression in a distributed data grid, in accordance with an embodiment of the invention.

FIG. 7 illustrates an exemplary flow chart for supporting elastic data metadata compression in a distributed data grid, in accordance with an embodiment of the invention. As shown in FIG. 7, at step 701, the system can store a plurality of keys in a tree in a virtual machine (VM) heap, wherein each said key is associated with an entry in a journal off-heap. Then, at step 702, the system can look up the tree for a key, wherein the key is associated with a journal ticket that represents a virtual address of an entry in the journal. Furthermore, at step 703, the system can use the journal ticket to manage an entry associated with said key.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting metadata compression in a distributed data grid, comprising:
storing a plurality of keys in a compact data structure in a heap, wherein said compact data structure is a radix tree and each said key is associated with an entry of a journal off-heap;
looking up the radix tree for a key, wherein the key is associated with a journal ticket that represents a virtual address of an entry in the journal; and
using the journal ticket to manage the entry in the journal that is associated with said key.

2. The method according to claim 1, further comprising:
including a RAM journal in the journal off-heap, and
including a flash journal in the journal off-heap, wherein the flash journal operates to transparently handle data overflow from the RAM journal.

3. The method according to claim 1, further comprising:
allowing the heap to be a virtual machine (VM) heap.

4. The method according to claim 1,
wherein each key in the radix tree corresponds to a value stored in an entry in a journal off-heap.

5. The method according to claim 4, further comprising:
storing an value corresponding to a key directly in the radix tree if the size of the value is small.

6. The method according to claim 4, further comprising:
storing one or more journal tickets in the radix tree, wherein each said journal ticket is associated with a key.

7. The method according to claim 4, further comprising:
storing one or more journal tickets in a long storage array, wherein each said journal ticket is associated with a key.

8. The method according to claim 7, further comprising:
associating the key stored in the radix tree with a slot number, wherein the slot number indicates a location in the long storage array where said journal ticket stores.

9. The method according to claim 8, further comprising:
storing additional attributes that are associated with the key in the long storage array.

10. The method according to claim 9, further comprising:
compacting multiple small attributes together into a single attribute stored in the long storage array.

11. A system for supporting metadata compression in a distributed data grid, comprising:
one or more microprocessors;
the distributed data grid, which runs on the one or more microprocessors, that operates to store a plurality of keys in a radix tree in a compact data structure in a heap, wherein
each said key is associated with an entry of a journal off-heap;
look up the radix tree for a key, wherein the key is associated with a journal ticket that represents a virtual address of an entry in the journal; and
use the journal ticket to manage the entry in the journal that is associated with said key.

12. The system according to claim 11, wherein:
the journal off-heap includes a RAM journal, and a flash journal that operates to transparently handle data overflow from the RAM journal.

13. The system according to claim 11, wherein:
the the heap is a virtual machine (VM) heap.

14. The system according to claim 11, wherein each key in the radix tree corresponds to a value.

15. The system according to claim 14, wherein:
a value corresponding to a key is stored directly in the radix tree if the size of the value is small.

16. The system according to claim 14, wherein:
one or more journal tickets are stored in the radix tree, wherein each said journal ticket is associated with a key.

17. The system according to claim 14, wherein:
one or more journal tickets are stored in a long storage array, wherein each said journal ticket is associated with a key.

18. The system according to claim 17, wherein:
the key stored in the radix tree is associated with a slot number, wherein the slot number indicates a location in the long storage array where said journal ticket stores, and wherein the long storage array stores additional attributes that are associated with the key.

19. The system according to claim 18, wherein:
multiple small attributes are compacted together into a single attribute stored in the long storage array.

20. A non-transitory machine readable storage medium having instructions stored thereon for supporting metadata compression in a distributed data grid that when executed cause a system to perform the steps comprising:
storing a plurality of keys in a compact data structure in a heap, wherein said compact data structure is a radix tree and each said key is associated with an entry of a journal off-heap, wherein each said key is associated with an entry in a journal off-heap;
looking up the radix tree for a key, wherein the key is associated with a journal ticket that represents a virtual address of an entry in the journal; and
using the journal ticket to manage the entry in the journal that is associated with said key.

* * * * *

UNITED STATES PATENT AND TRADEMARK OFFICE
CERTIFICATE OF CORRECTION

| | | |
|---|---|---|
| PATENT NO. | : 9,697,220 B2 | Page 1 of 1 |
| APPLICATION NO. | : 14/322576 | |
| DATED | : July 4, 2017 | |
| INVENTOR(S) | : Lee et al. | |

It is certified that error appears in the above-identified patent and that said Letters Patent is hereby corrected as shown below:

On the Title Page

On page 2, Column 1, under Other Publications, Line 9, delete "as sets" and insert -- assets --, therefor.

In the Drawings

On sheet 7 of 7, in Figure. 7, under Reference Numeral 701, Line 1, delete "virtua l" and insert -- virtual --, therefor.

In the Claims

In Column 8, Line 13, in Claim 13, delete "the the" and insert -- the --, therefor.

Signed and Sealed this
Twenty-ninth Day of May, 2018

Andrei Iancu
*Director of the United States Patent and Trademark Office*